United States Patent
Currey (10) Patent No.: US 9,124,562 B1
(45) Date of Patent: Sep. 1, 2015

(54) CLOUD-BASED DECOMPOSITION AND RECOMPOSITION FOR CROSS-PLATFORM DISPLAY

(75) Inventor: Robert W. Currey, Redding, CA (US)

(73) Assignee: hopTo Inc., Campbell, CA (US)

(*) Notice: Subject to any disclaimer, the term of this patent is extended or adjusted under 35 U.S.C. 154(b) by 98 days.

(21) Appl. No.: 13/475,918

(22) Filed: May 18, 2012

(51) Int. Cl.
G06F 15/16 (2006.01)
H04L 29/08 (2006.01)

(52) U.S. Cl.
CPC ....................... H04L 67/06 (2013.01)

(58) Field of Classification Search
CPC .................................................. G06F 3/0481
USPC ......... 345/419, 520, 522, 530, 660, 672, 682; 375/240.16; 382/166; 455/566; 709/203, 206, 213, 217, 219, 220; 715/740, 760; 725/9, 39, 40, 53, 93, 725/100, 109, 203, 204, 744
See application file for complete search history.

(56) References Cited

U.S. PATENT DOCUMENTS

| | | | |
|---|---|---|---|
| 5,745,115 | A | 4/1998 | Purple et al. |
| 5,831,609 | A | 11/1998 | London et al. |
| 6,421,070 | B1 | 7/2002 | Ramos et al. |
| 6,636,242 | B2 | 10/2003 | Bowman-Amuah |
| 6,710,786 | B1 | 3/2004 | Jacobs et al. |
| 6,758,394 | B2 | 7/2004 | Maskatiya et al. |
| 7,039,875 | B2 | 5/2006 | Khalfay et al. |
| 7,185,069 | B2 * | 2/2007 | Costin et al. ............... 709/219 |
| 7,210,099 | B2 | 4/2007 | Rohrabaugh et al. |
| 7,325,027 | B2 | 1/2008 | Grown et al. |
| 7,418,472 | B2 | 8/2008 | Shoemaker et al. |
| 7,472,157 | B2 | 12/2008 | Tolson et al. |
| 7,631,328 | B2 | 12/2009 | Clancy et al. |
| 7,667,704 | B2 | 2/2010 | Hogle |
| 7,844,889 | B2 | 11/2010 | Rohrabaugh et al. |
| 7,877,703 | B1 | 1/2011 | Fleming |
| 8,073,954 | B1 * | 12/2011 | Tu et al. ............... 709/227 |
| 8,108,830 | B2 | 1/2012 | Bibr et al. |

(Continued)

FOREIGN PATENT DOCUMENTS

| | | |
|---|---|---|
| WO | WO 00/30729 | 6/2000 |
| WO | WO 2004/059938 | 7/2004 |

OTHER PUBLICATIONS

Fabio Paternò, Carmen Santoro, and Antonio Scorcia. 2008. Automatically adapting web sites for mobile access through logical descriptions and dynamic analysis of interaction resources. In Proceedings of the working conference on Advanced visual interfaces (AVI '08). ACM, New York, NY, USA, 260-267. DOI=10.1145/1385569.1385611 http://doi.acm.org/10.*

(Continued)

*Primary Examiner* — Joshua Joo
(74) *Attorney, Agent, or Firm* — Lewis Roca Rothgerber LLP (57) ABSTRACT

Data including information regarding a display of the host device may be received. Such information may be used to identify multiple portions of the host device display. Each portion is mapped to an associated description. For example, a task bar may include multiple buttons that are each associated with certain tasks. The map allows for identification of which buttons are associated with which tasks. Each description is matched to a component on the client device. Instructions may be generated for the client device, such that the client device display may include a corresponding display that is reconfigured in an optimal way for the client device based on the matched descriptions.

20 Claims, 4 Drawing Sheets

(56) References Cited

U.S. PATENT DOCUMENTS

| | | | |
|---|---|---|---|
| 8,583,627 B1 | 11/2013 | Kamvar et al. | |
| 8,763,054 B1 | 6/2014 | Eilam | |
| 8,763,055 B1 | 6/2014 | Eilam | |
| 8,775,545 B1 | 7/2014 | Eilam | |
| 8,776,152 B1 | 7/2014 | Eilam | |
| 8,856,262 B1 | 10/2014 | Eilam | |
| 8,990,363 B1 | 3/2015 | Currey | |
| 2002/0103906 A1 | 8/2002 | Knight et al. | |
| 2002/0196378 A1 | 12/2002 | Slobodin et al. | |
| 2003/0053091 A1 | 3/2003 | Tanaka et al. | |
| 2003/0058286 A1* | 3/2003 | Dando | 345/853 |
| 2003/0069923 A1 | 4/2003 | Peart | |
| 2003/0182628 A1 | 9/2003 | Lira | |
| 2003/0208529 A1* | 11/2003 | Pendyala et al. | 709/203 |
| 2004/0024899 A1 | 2/2004 | Sturrock et al. | |
| 2004/0177155 A1 | 9/2004 | Enokida et al. | |
| 2004/0205715 A1 | 10/2004 | Taylor | |
| 2004/0267813 A1 | 12/2004 | Rivers-Moore et al. | |
| 2005/0080915 A1 | 4/2005 | Shoemaker et al. | |
| 2005/0198100 A1 | 9/2005 | Goring et al. | |
| 2005/0235214 A1 | 10/2005 | Shimizu et al. | |
| 2006/0002315 A1 | 1/2006 | Theurer et al. | |
| 2006/0020904 A1 | 1/2006 | Aaltonen et al. | |
| 2006/0055701 A1 | 3/2006 | Taylor et al. | |
| 2006/0082581 A1 | 4/2006 | Schmieder et al. | |
| 2006/0082582 A1 | 4/2006 | Schmieder et al. | |
| 2006/0082583 A1 | 4/2006 | Leichtling et al. | |
| 2006/0085550 A1 | 4/2006 | Schmieder et al. | |
| 2006/0087512 A1 | 4/2006 | Schmieder et al. | |
| 2006/0149810 A1* | 7/2006 | Koo et al. | 709/203 |
| 2006/0184982 A1 | 8/2006 | Paz et al. | |
| 2006/0195523 A1* | 8/2006 | Juang et al. | 709/204 |
| 2006/0225037 A1 | 10/2006 | Glein et al. | |
| 2006/0227141 A1 | 10/2006 | Hogle | |
| 2006/0274302 A1 | 12/2006 | Shylanski et al. | |
| 2007/0005693 A1 | 1/2007 | Sampath et al. | |
| 2007/0016651 A1 | 1/2007 | Blagsvedt et al. | |
| 2007/0124536 A1 | 5/2007 | Carper | |
| 2007/0153319 A1 | 7/2007 | Moon et al. | |
| 2007/0162854 A1 | 7/2007 | Kikinis | |
| 2007/0220419 A1 | 9/2007 | Stibel et al. | |
| 2007/0229524 A1 | 10/2007 | Hendrey et al. | |
| 2008/0009344 A1 | 1/2008 | Graham et al. | |
| 2008/0016155 A1 | 1/2008 | Khalatian | |
| 2008/0034320 A1 | 2/2008 | Ben-Shachar et al. | |
| 2008/0082604 A1* | 4/2008 | Mansour et al. | 709/203 |
| 2008/0098291 A1 | 4/2008 | Bradley et al. | |
| 2008/0307047 A1 | 12/2008 | Jowett et al. | |
| 2008/0320396 A1 | 12/2008 | Mizrachi et al. | |
| 2009/0044103 A1 | 2/2009 | Chalecki et al. | |
| 2009/0100483 A1 | 4/2009 | McDowell | |
| 2009/0125838 A1 | 5/2009 | Bhogal et al. | |
| 2009/0157657 A1 | 6/2009 | Kim et al. | |
| 2009/0228779 A1* | 9/2009 | Williamson et al. | 715/233 |
| 2009/0271501 A1 | 10/2009 | Shenfield et al. | |
| 2009/0292999 A1* | 11/2009 | LaBine et al. | 715/740 |
| 2009/0320073 A1 | 12/2009 | Reisman | |
| 2010/0005396 A1 | 1/2010 | Nason et al. | |
| 2010/0111410 A1* | 5/2010 | Lu et al. | 382/166 |
| 2010/0118039 A1 | 5/2010 | Labour | |
| 2010/0138809 A1 | 6/2010 | Shenfield et al. | |
| 2010/0174974 A1 | 7/2010 | Brisebois et al. | |
| 2010/0279678 A1 | 11/2010 | Li et al. | |
| 2010/0281402 A1 | 11/2010 | Staikos et al. | |
| 2011/0032328 A1 | 2/2011 | Raveendran et al. | |
| 2011/0040826 A1* | 2/2011 | Chadzelek et al. | 709/203 |
| 2011/0041092 A1* | 2/2011 | Zhang | 715/777 |
| 2011/0078532 A1 | 3/2011 | Vonog et al. | |
| 2011/0078621 A1 | 3/2011 | Kanda | |
| 2011/0085016 A1 | 4/2011 | Kristiansen et al. | |
| 2011/0099494 A1 | 4/2011 | Yan et al. | |
| 2011/0113089 A1 | 5/2011 | Pryadarashan et al. | |
| 2011/0213855 A1 | 9/2011 | King | |
| 2011/0219331 A1 | 9/2011 | DeLuca et al. | |
| 2011/0231782 A1* | 9/2011 | Rohrabaugh et al. | 715/760 |
| 2011/0239142 A1 | 9/2011 | Steeves et al. | |
| 2011/0252299 A1 | 10/2011 | Lloyd et al. | |
| 2011/0283304 A1* | 11/2011 | Roberts et al. | 725/9 |
| 2011/0299785 A1 | 12/2011 | Albu et al. | |
| 2012/0005691 A1 | 1/2012 | Wong et al. | |
| 2012/0042275 A1 | 2/2012 | Neerudu et al. | |
| 2012/0062576 A1 | 3/2012 | Rosenthal et al. | |
| 2012/0075346 A1 | 3/2012 | Malladi et al. | |
| 2012/0079043 A1 | 3/2012 | Brown et al. | |
| 2012/0084456 A1 | 4/2012 | Vonog et al. | |
| 2012/0093231 A1* | 4/2012 | Nozawa | 375/240.16 |
| 2012/0102549 A1 | 4/2012 | Mazzaferri et al. | |
| 2012/0114233 A1 | 5/2012 | Gunatilake | |
| 2012/0117145 A1 | 5/2012 | Clift et al. | |
| 2012/0124497 A1 | 5/2012 | Kasoju et al. | |
| 2012/0166967 A1 | 6/2012 | Deimbacher et al. | |
| 2012/0169610 A1 | 7/2012 | Berkes et al. | |
| 2012/0192078 A1 | 7/2012 | Bai et al. | |
| 2012/0214552 A1 | 8/2012 | Sirpal et al. | |
| 2012/0223884 A1 | 9/2012 | Bi et al. | |
| 2012/0254453 A1 | 10/2012 | Lejeune et al. | |
| 2012/0266068 A1 | 10/2012 | Ryman et al. | |
| 2012/0266079 A1 | 10/2012 | Lee et al. | |
| 2012/0299968 A1 | 11/2012 | Wong et al. | |
| 2012/0317295 A1 | 12/2012 | Baird et al. | |
| 2013/0019263 A1 | 1/2013 | Ferren et al. | |
| 2013/0055102 A1* | 2/2013 | Matthews et al. | 715/740 |
| 2013/0124609 A1* | 5/2013 | Martinez et al. | 709/203 |
| 2013/0194374 A1 | 8/2013 | Kieft et al. | |
| 2013/0215129 A1* | 8/2013 | Keslin | 345/522 |
| 2013/0229548 A1 | 9/2013 | Masuko | |
| 2014/0082511 A1* | 3/2014 | Weissberg et al. | 715/740 |
| 2014/0223314 A1* | 8/2014 | Pinto et al. | 715/733 |

OTHER PUBLICATIONS

U.S. Appl. No. 13/341,207, Eldad Eilam, Automatic Adjustment for Cross-Platform Display, filed Dec. 30, 2011.
U.S. Appl. No. 13/341,432, Eldad Eilam, Cloud Based Automatic Adjustment for Cross-Platform Display, filed Dec. 30, 2011.
U.S. Appl. No. 13/341,215, Eldad Eilam, Managing Text for Cross-Platform Display, filed Dec. 30, 2011.
U.S. Appl. No. 13/341,750, Eldad Eilam, Cloud-based Text Management for Cross-Platform Display, filed Dec. 30, 2011.
U.S. Appl. No. 13/341,222, Eldad Eilam, Change Detection for Cross-Platform Display, filed Dec. 30, 2011.
U.S. Appl. No. 13/341,754, Eldad Eilam, Cloud Based Change Detection for Cross-Platform Display, filed Dec. 30, 2011.
U.S. Appl. No. 13/341,227, Eldad Eilam, Motion Vectors for Cross-Platform Display, filed Dec. 30, 2011.
U.S. Appl. No. 13/341,756, Eldad Eilam, Cloud-Based Motion Vectors for Cross-Platform Display, filed Dec. 30, 2011.
U.S. Appl. No. 13/341,232, Eldad Eilam, Client Side Detection of Motion Vectors for Cross-Platform Display, filed Dec. 30, 2011.
U.S. Appl. No. 13/341,238, Eldad Eilam, Image Hosting for Cross-Platform Display Over a Communication Network, filed Dec. 30, 2011.
U.S. Appl. No. 13/341,760, Eldad Eilam, Cloud-Based Image Hosting, filed Dec. 30, 2011.
U.S. Appl. No. 13/341,425, Eldad Eilam, Client Rendering, filed Dec. 30, 2011.
U.S. Appl. No. 13/341,765, Eldad Eilam, Cloud-Based Client Rendering, filed Jun. 6, 2012.
U.S. Appl. No. 13/490,327, Eldad Eilam, User Interface Management for Cross-Platform Display, filed Jun. 6, 2012.
U.S. Appl. No. 13/490,329, Eldad Eilam, User Interface Management for Cross-Platform Display, filed Jun. 6, 2012.
U.S. Appl. No. 13/490,330, Eldad Eilam, Cloud-Based User Interface Management for Cross-Platform Display, filed May 18, 2012.
U.S. Appl. No. 13/475,911, Eldad Eilam, Facilitating Responsive Scrolling for Cross-Platform Display, filed May 18, 2012.
U.S. Appl. No. 13/475,912, Eldad Eilam, Facilitating Responsive Scrolling for Cross-Platform Display, filed May 18, 2012.
U.S. Appl. No. 13/475,913, Eldad Eilam, Cloud-Based Facilitation of Responsive Scrolling for Cross-Platform Display, filed May 18, 2012.

(56) References Cited

OTHER PUBLICATIONS

U.S. Appl. No. 13/475,916, Robert W. Currey, Decomposition and Recomposition for Cross-Platform Display, filed May 18, 2012.
U.S. Appl. No. 13/475,917, Robert W. Currey, Decomposition and Recomposition for Cross-Platform Display, filed May 18, 2012.
U.S. Appl. No. 13/668,091, Eldad Eilam, Cross-Platform Video Display, filed Nov. 2, 2012.
U.S. Appl. No. 13/670,163, Eldad Eilam, Cross-Platform Video Display, filed Nov. 6, 2012.
U.S. Appl. No. 13/668,095, Eldad Eilam, Cloud-Based Cross-Platform Video Display, filed Nov. 2, 2012.
U.S. Appl. No. 13/831,782, CK Hsu, Using Split Windows for Cross-Platform Document Views, filed Mar. 15, 2013.
U.S. Appl. No. 13/831,783, CK Hsu, Using Split Windows for Cross-Platform Document Views, filed Mar. 15, 2013.
U.S. Appl. No. 13/831,786, CK Hsu, Cloud-Based Usage of Split Windows for Cross-Platform Document Views, filed Mar. 15, 2013.
U.S. Appl. No. 13/341,754, Office Action dated Jul. 31, 2013.
U.S. Appl. No. 13/341,238 Office Action dated Apr. 22, 2013.
U.S. Appl. No. 13/341,760 Office Action dated May 15, 2013.
U.S. Appl. No. 13/668,091 Office Action dated Apr. 23, 2013.
U.S. Appl. No. 13/670,163 Office Action dated May 7, 2013.
U.S. Appl. No. 13/668,095 Office Action dated Apr. 23, 2013.
Andujar, C.; Fairen, M.; Argelaguet, F., "A Cost-effective Approach for Developing Application-control GUIs for Virtual Environments," 3D User Interfaces, 2006. 3DUI 2006. IEEE Symposium on, vol., no., pp. 45,52, Mar. 25-29, 2006, doi:10.1109/VR.2006.6.
Borchers, J.; Ringel, M.; Tyler, J.; Fox, A., "Stanford interactive workspaces: a framework for physical and graphical user interface prototyping," Wireless Communications, IEEE, vol. 9, No. 6, pp. 64,69, Dec. 2002. doi: 10-1109/MWC.2002.1160083.
Boyaci, O.; Schulzrinne, Henning, "BASS Application Sharing System," Multimedia, 2008. ISM 2008. Tenth IEEE International Symposium on, vol., no., pp. 432,439, Dec. 15-17, 2008. doi:10.1109/ISM.2008.97.
Davidyuk, O., Georgantas, N., Issarny, V. & Riekki, J. (2009). MEDUSA: Middleware for End-User Composition of Ubiquitous Applications, In: Mastrogiovanni, F. & Chong, N.Y. (Eds.), Handbook of Research on Ambient Intelligence and Smart Environments: Trends and Perspectives. IGI Global, to appear. Retrieved from: http://www.mediateam.oulu.fi/public.
Fabio Paterno, Carmen Santoro, and Antonio Scorcia. 2008. Automatically adapting websites for mobile access through logical descriptions and dynamic analysis of interaction resources. In Proceedings of the working conference on Advanced visual interfaces (AVI '08). ACM, New York, NY, USA, 260-267. DOI=10.1145/1385569.1385611 http://doi.org/10.
Giullo Mori, Fabio Paterno, and Carmen Santoro. 2003. Tool support for designing nomadic applications. In Proceedings of the 8th international conference on Intelligent user interfaces (IUI '03). ACM, New York, NY, USA, 141-148. DOI=10.1145/604045.604069 http://doi.acm.org/10.1145/604045.604069.
Giullo Mori, Fabio Paterno, and Carmen Santoro, "Design and development of multidevice user interfaces through multiple logical descriptions," IEEE Transactions on Software Engineering, vol. 30, No. 8, pp. 507-520, Aug. 2004. doi:10-1109/TSE.2004.40.
Huifeng Shen; Yan Lu; Feng Wu; Shipeng Li, "A high-performance remote computing platform," Pervasive Computing and Communications, 2009. PerCom 2009. IEEE International Conference on, vol., no., pp. 1,6, Mar. 9-13, 2009. doi:10.1109/PERCOM.2009.4912855.
Murielle Florins and Jean Vanderdonckt. 2004. Graceful degradation of user interfaces as a design method for multiplatform systems. In Proceedings of the 9th international conference on Intelligent user interfaces (IUI '04). ACM, New York, NY, USA, 140-147. DOI=10.1145/964442.964469 http://doi.acm.org/10.1145/964442.964469.
Nathalie Aquino, Jean Vanderonckt, and Oscar Pastor. 2010. Transformation templates: adding flexibility to model-driven engineering of user interfaces. In Proceedings of the 2010 ACM Symposium on Applied Computing (SAC '10). ACM, New York, NY, USA, 1195-1202. DOI=10.1145/1774088.1774340 http://doi.acm.org/10-1145/1774088.1774340.
Oleg Davidyuk, Ivan Sanchez, Jon Imanol Duran, and Jukka Riekki. 2008. Autonomic composition of ubiquitous multimedia applications in REACHES. In Proceedings of the 7th International Conference on Mobile and Ubiquitous Multimedia (MUM '08). ACM, New York, NY, USA. 105-108. DOI=10.1145/1543137.1543159 http://doi.acm.org/10.1145/1543137.1543159.
Xu Hu; Congfeng Jiang; Wei Zhang; Jilin Zhang; Ritai Yu; Changping Lv, "An Even Based GUI Programming Toolkit for Embedded System," Services Computing Conference (APSCC), 2010 IEEE Asia-Pacific, vol., no., pp. 625,631, Dec. 6-10, 2010. doi: 10-1109/APSCC.2010.115.
U.S. Appl. No. 13/341,207 Office Action mailed Nov. 18, 2013.
U.S. Appl. No. 13/341,754, Office Action dated Jan. 8, 2014.
U.S. Appl. No. 13/341,227 Office Action mailed Oct. 23, 2013.
U.S. Appl. No. 13/341,756 Office Action mailed Aug. 13, 2013.
U.S. Appl. No. 13/341,238 Final Office Action dated Sep. 17, 2013.
U.S. Appl. No. 13/341,760 Office Action dated Nov. 20, 2013.
U.S. Appl. No. 13/490,329 Office Action mailed Jan. 15, 2014.
U.S. Appl. No. 13/490,330 Office Action mailed Dec. 17, 2013.
U.S. Appl. No. 13/475,916 Office Action dated Nov. 13, 2013.
U.S. Appl. No. 13/475,917 Office Action dated Nov. 18, 2013.
U.S. Appl. No. 13/668,091 Final Office Action dated Nov. 6, 2013.
U.S. Appl. No. 13/670,163 Office Action dated Nov. 6, 2013.
U.S. Appl. No. 13/668,095 Office Action dated Nov. 5, 2013.
U.S. Appl. No. 13/831,782 Office Action dated Nov. 6, 2013.
U.S. Appl. No. 13/831,783 Final Office Action dated Dec. 17, 2013.
U.S. Appl. No. 13/831,783 Office Action dated Sep. 3, 2013.
Ali, Mir Farooq, et al., "Building multi-platform user interfaces with UIML." Computer-Aided Design of User Interfaces III. Springer Netherlands, 2002. 255-266.
Cuergo, "Ergonomic Guidelines for arranging a Computer Workstation—10 steps for users", Jun. 6, 2004. p. 1-5.
Holzinger, Andreas, Peter Treitler, and Wolfgang Slany. "Making apps useable on multiple different mobile platforms: On interoperability for business application development on smartphones." Multidisciplinary Research and Practice for Information Systems. Springer Berlin Heidelberg, 2012. 176-189.
Karch, Marziah, "Android in a Microsoft World." Android for Work. Apress, 2010. 93-102.
U.S. Appl. No. 13/341,207 Final Office Action mailed May 14, 2014.
U.S. Appl. No. 13/341,222, Final Office Action mailed May 15, 2014.
U.S. Appl. No. 13/341,756 Office Action mailed Jun. 11, 2014.
U.S. Appl. No. 13/341,232 Final Office Action mailed Jun. 18, 2014.
U.S. Appl. No. 13/341,765 Final Office Action mailed Jun. 24, 2014.
U.S. Appl. No. 13/490,330 Final Office Action mailed Jul. 17, 2014.
U.S. Appl. No. 13/475,911 Office Action mailed Jun. 24, 2014.
U.S. Appl. No. 13/475,912 Office Action mailed Jun. 24, 2014.
U.S. Appl. No. 13/475,913 Office Action mailed Jun. 24, 2014.
U.S. Appl. No. 13/831,782 Office Action mailed Jul. 17, 2014.
U.S. Appl. No. 13/831,786 Final Office Action mailed Dec. 17, 2013.
U.S. Appl. No. 13/831,786 Office Action mailed Sep. 4, 2013.
U.S. Appl. No. 13/341,425 Final Office Action mailed Aug. 29, 2014.
U.S. Appl. No. 13/490,327 Final Office Action mailed Aug. 21, 2014.
U.S. Appl. No. 13/490,329 Final Office Action mailed Aug. 11, 2014.
U.S. Appl. No. 13/831,783 Office Action mailed Sep. 19, 2014.
U.S. Appl. No. 13/831,786 Office Action mailed Sep. 16, 2014.
U.S. Appl. No. 13/341,432 Final Office Action mailed Nov. 19, 2014.
U.S. Appl. No. 13/341,215 Final Office Action mailed Dec. 12, 2014.
U.S. Appl. No. 13/341,227 Office Action mailed Dec. 29, 2014.
U.S. Appl. No. 13/341,756 Final Office Action mailed Oct. 22, 2014.
U.S. Appl. No. 13/341,207 Office Action mailed Jan. 27, 2015.
U.S. Appl. No. 13/341,750 Final Office Action mailed Jan. 30, 2015.
U.S. Appl. No. 13/341,222, Office Action mailed Jan. 29, 2015.
U.S. Appl. No. 13/341,232 Office Action mailed Feb. 6, 2015.
U.S. Appl. No. 13/341,765 Office Action mailed Mar. 16, 2015.
U.S. Appl. No. 13/490,330 Office Action mailed Mar. 11, 2015.
U.S. Appl. No. 13/475,911 Final Office Action mailed Mar. 10, 2015.
U.S. Appl. No. 13/475,912 Final Office Action mailed Mar. 10, 2015.
U.S. Appl. No. 13/475,913 Final Office Action mailed Jun. 24, 2014.
U.S. Appl. No. 13/831,782 Final Office Action mailed Feb. 13, 2015.

(56) References Cited

OTHER PUBLICATIONS

U.S. Appl. No. 13/341,222, Office Action mailed Jan. 27, 2014.
U.S. Appl. No. 13/341,756 Final Office Action mailed Feb. 4, 2014.
U.S. Appl. No. 13/341,232 Office Action mailed Mar. 10, 2014.
U.S. Appl. No. 13/341,425 Office Action mailed Mar. 5, 2014.
U.S. Appl. No. 13/341,765 Office Action mailed Feb. 7, 2014.
U.S. Appl. No. 13/490,327 Office Action mailed Jan. 28, 2014.
U.S. Appl. No. 13/475,916 Final Office Action mailed Mar. 12, 2014.
U.S. Appl. No. 13/475,917 Final Office Action mailed Mar. 12, 2014.
U.S. Appl. No. 13/831,782 Final Office Action mailed Feb. 24, 2014.
U.S. Appl. No. 13/341,432 Office Action mailed Mar. 27, 2015.
U.S. Appl. No. 13/341,754, Final Office Action mailed Jan. 13, 2015.
U.S. Appl. No. 13/341,756 Office Action mailed Mar. 27, 2015.
U.S. Appl. No. 13/475,913 Final Office Action mailed Mar. 10, 2015.
U.S. Appl. No. 14/312,925 Office Action mailed Mar. 25, 2015.
U.S. Appl. No. 13/341,432 Office Action mailed Mar. 24, 2014.
U.S. Appl. No. 13/341,215 Office Action mailed Mar. 21, 2014.
U.S. Appl. No. 13/341,750 Office Action mailed Apr. 16, 2014.
U.S. Appl. No. 13/341,754, Office Action mailed Apr. 16, 2014.
U.S. Appl. No. 13/341,227 Final Office Action mailed Apr. 18, 2014.
Docket No. Gojo-007, U.S. Patent Application No. 13/341,215 Office Action mailed 4/17/15.
Docket No. Gojo-011COA, U.S. Patent Application no. 14/337,659 Office Action mailed 3/31/15.
Docket No. Gojo-012, U.S. Patent Application No. 13/341,425 Office Action mailed 4/10/15.
Docket No. Gojo-013, U.S. Patent Application No. 13/490,327 Office Action mailed 4/13/15.
Docket No. Gojo-013DVA, U.S. Patent Application No. 13/490,329 Office Action mailed 4/3/15.
Docket No. Gojo-024DVB, U.S. Patent Application No. 13/831,786 Final Office Action mailed 4/9/15.

* cited by examiner

CLOUD-BASED DECOMPOSITION AND RECOMPOSITION FOR CROSS-PLATFORM DISPLAY

BACKGROUND

1. Field of the Invention

The present invention generally relates to cross-platform display. More specifically, the present invention relates to decomposition and recomposition for cross-platform display.

2. Description of the Related Art

Individuals currently have a variety of options for communicating and carrying out transactions. Such options may include traditional desktop computing devices, as well as various mobile devices (e.g., mobile phones, smartphones, tablets). In fact, many individuals may use multiple computing and mobile devices at home, work, and on the move. For example, an individual may use a desktop computer at work, a laptop computer at home, and one or more mobile devices (e.g., smartphone, tablet) elsewhere. As such, people have come to expect to be able to have access to data and computing resources so to perform most computing tasks anywhere.

One difficulty in meeting such an expectation is that the various computing devices may not all have the same capabilities. For example, such devices may run different operating systems/platforms and applications. Such differences may make it difficult to support the same tasks across such devices. One solution has been to provide remote desktops where a first device runs the applications and a second device receives the visual display that appears on the first device over a communication network (e.g., Internet). Such remote desktops can allow users to access and control resources and data on the first device at a remote location using a second (e.g., portable) device.

One drawback to such an approach arises from the fact that such devices are generally used differently, so applications may be optimized for one type of device, but not another. For example, the different devices may have different sizes and input options (e.g., keyboard, keypad, touchscreen). The display of one device may not be optimized for a second device. For example, if a desktop computer display is shrunk to fit on a smartphone screen, the shrunken size may be difficult for the user to read or discern what is being displayed. Alternatively, if the display is not shrunk, the smartphone may only be able to display a portion of the original display at a time, which also adds to the difficulty in reading and discerning what is being displayed. While some devices allow for manual adjustment of the display by the user, changing displays and images may require the user to continually re-adjust the display, which may be unwieldy and inconvenient. Such is the case in many applications where content only uses a portion of the screen and user interface portions (e.g., toolbars, status bars, scroll bars, rulers).

There is, therefore, a need in the art for improved systems and methods for decomposition and recomposition for cross-platform display.

SUMMARY OF THE CLAIMED INVENTION

Embodiments of the present invention include systems and methods of decomposition and recomposition for cross-platform display. Data including information regarding a display of the host device may be received. Such information may be used to identify multiple portions of the host device display. Each portion is determined to be associated with a description. Each description is mapped to a component that may be used by the client device. Instructions may be generated for the client device, such that the client device display may include a corresponding display that is reconfigured in an optimal way for the client device based on the mapped descriptions.

Various embodiments of the present invention include methods of decomposition and recomposition for cross-platform display. Such methods may include receiving data including information regarding a display of a host device, executing instructions to identify multiple portions of the display of the host device, determine an associated description for each portion, map the description to a corresponding component for the client device, and generate instructions for a display of a client device based on the mapped descriptions. As a result, the client device display may correspond to the host device display, though reconfigured based on the mapped descriptions.

Embodiments of the present invention may further include systems of decomposition and recomposition for cross-platform display. Such systems may include a host device and a client device requesting information from a host device. The host device may provide data including information regarding a display of the host device. Such information may be used to identify multiple portions of the display of the host device, determine an associated description for each portion, map the description to a corresponding component for the client device, and generate instructions for a display of a client device based on the mapped descriptions. Execution of such instructions by the client device may result in a display corresponding to the host device display, though reconfigured based on the mapped descriptions. In some embodiments, an intermediate device (e.g., server) may receive the request from the client device, retrieve information from the host device, identify multiple portions of the display of the host device, determine an associated description for each portion, map the description to a corresponding component for the client device, generate instructions for a display of a client device based on the mapped descriptions, and send the instructions to the client device.

Other embodiments of the present invention include non-transitory computer-readable storage media on which is embodied instructions executable to perform a method of decomposition and recomposition for cross-platform display as previously set forth above.

DETAILED DESCRIPTION

Decomposition and recomposition for cross-platform display are provided. Data including information regarding a display of the host device may be received. Such information may be used to identify multiple portions of the host device display. Each portion is determined to be associated with a description. Each description is mapped to a component on the client device. Instructions may be generated for the client device, such that the client device display may include a corresponding display that is reconfigured in an optimal way for the client device based on the mapped descriptions.

Figure 1:
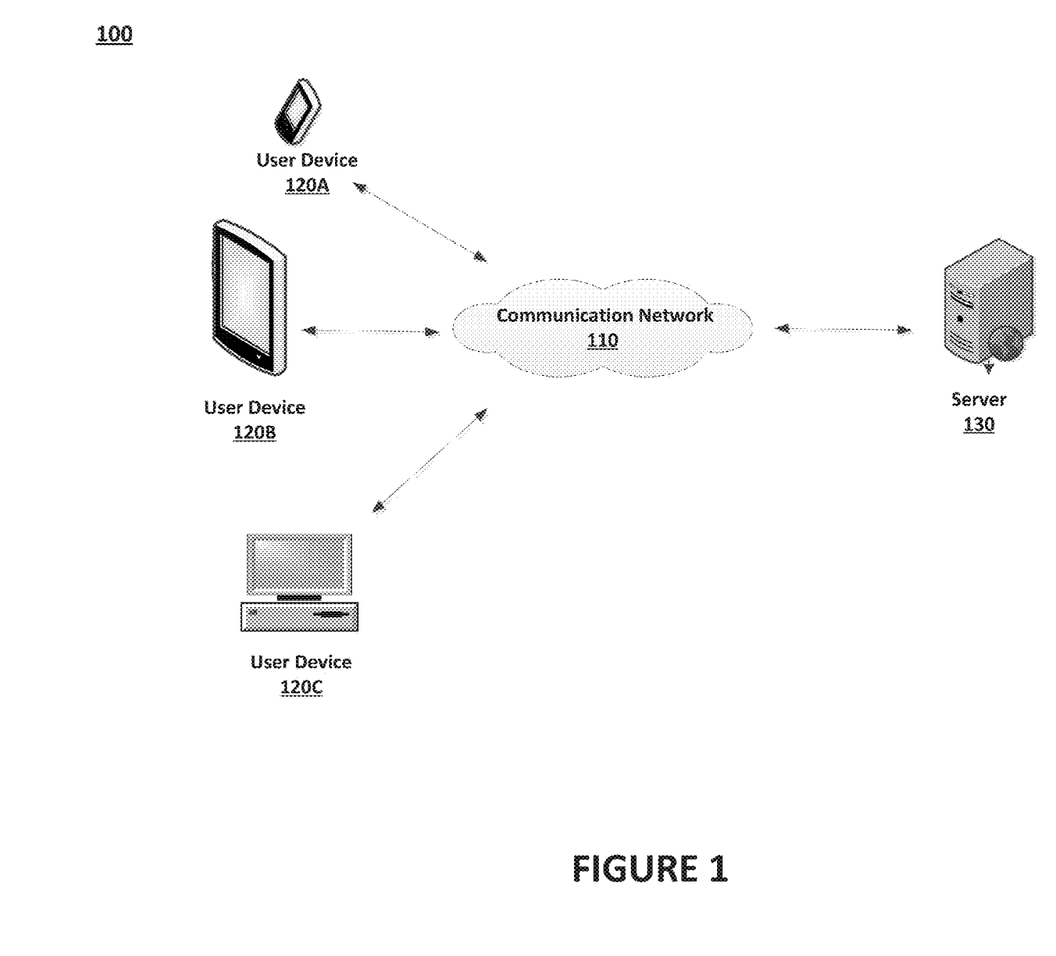
FIG. 1 illustrates a network environment in which an exemplary system of decomposition and recomposition for cross-platform display may be implemented.

FIG. 1 illustrates a network environment 100 in which a system for decomposition and recomposition for cross-platform display may be implemented. Network environment 100 may include a communication network 110, one or more user devices 120A-C, and a server 130. Devices in network environment 100 may communicate with each other via communications network 110.

Communication network 110 may be a local, proprietary network (e.g., an intranet) and/or may be a part of a larger wide-area network (e.g., the cloud). The communications network 110 may be a local area network (LAN), which may be communicatively coupled to a wide area network (WAN) such as the Internet. The Internet is a broad network of interconnected computers and servers allowing for the transmission and exchange of Internet Protocol (IP) data between users connected through a network service provider. Examples of network service providers are the public switched telephone network, a cable service provider, a provider of digital subscriber line (DSL) services, or a satellite service provider. Communications network 110 allows for communication between the various components of network environment 100.

Users may use any number of different electronic user devices 120A-C, such as general purpose computers, mobile phones, smartphones, personal digital assistants (PDAs), portable computing devices (e.g., laptop, netbook, tablets), desktop computing devices, handheld computing devices, or any other type of computing device capable of communicating over communication network 110. User devices 120 may also be configured to access data from other storage media, such as memory cards or disk drives as may be appropriate in the case of downloaded services. User device 120 may include standard hardware computing components such as network and media interfaces, non-transitory computer-readable storage (memory), and processors for executing instructions that may be stored in memory.

User device 120A is illustrated as a mobile phone or smartphone, while user device 120B is illustrated as a tablet computing device and client device 120C is illustrated as a desktop device. As can be seen, each user device 120 is sized differently and/or has different input options. Exemplary embodiments of the present invention allow for tasks and applications that are specific to one user device 120 (e.g., desktop or laptop operating in a Microsoft Windows® environment) to be used and optimized for another user device 120 (e.g., touchscreen tablet operating in an Apple iOS® environment).

Each user device 120 may act as a host device interacting with a client device; likewise, each user device 120 may act as the client device in communication with a host. A user device 120 may further include a client application, a client 3D library, and a client display driver. Collectively, these elements may enable the user device and the user to consume computer graphics resources or services provided by server 130.

Server 130 may include any type of server or other computing device as is known in the art, including standard hardware computing components such as network and media interfaces, non-transitory computer-readable storage (memory), and processors for executing instructions or accessing information that may be stored in memory. The functionalities of multiple servers may be integrated into a single server. Any of the aforementioned servers (or an integrated server) may take on certain client-side, cache, or proxy server characteristics. These characteristics may depend on the particular network placement of the server or certain configurations of the server.

Server 130 may associated with the same user and located in the same local network as user device 120C. Alternatively, server 130 may be located remotely (e.g., in the cloud) and may be associated with a third party that provides services in accordance with embodiments of the present invention. In some instances, the services may be provided via software (e.g., software as a service) downloaded from server 130 to one or more user devices 120. Updated software may similarly be downloaded as the updates become available or as needed.

Server application may represent an application executing ("running") on server 130. The functionality of server application may be visible to and accessible by client 120 via application publishing over the cloud (e.g., communication network 110), such as that supported by GraphOn GO-Global, Microsoft Remote Desktop Services, and Citrix XenApp. Examples of server application may include a computer-aided design (CAD) application, such as AutoCAD® (by Autodesk, Inc. of San Rafael, Calif.) or Cadence Virtuoso (by Cadence Design Systems of San Jose, Calif.), a medical clinical workflow application such as Symbia.net (by Siemens AG of Munich, Germany), an interactive mapping application such as Google Earth (by Google, Inc of Mountain View, Calif.), or a 3D game.

Figure 2:
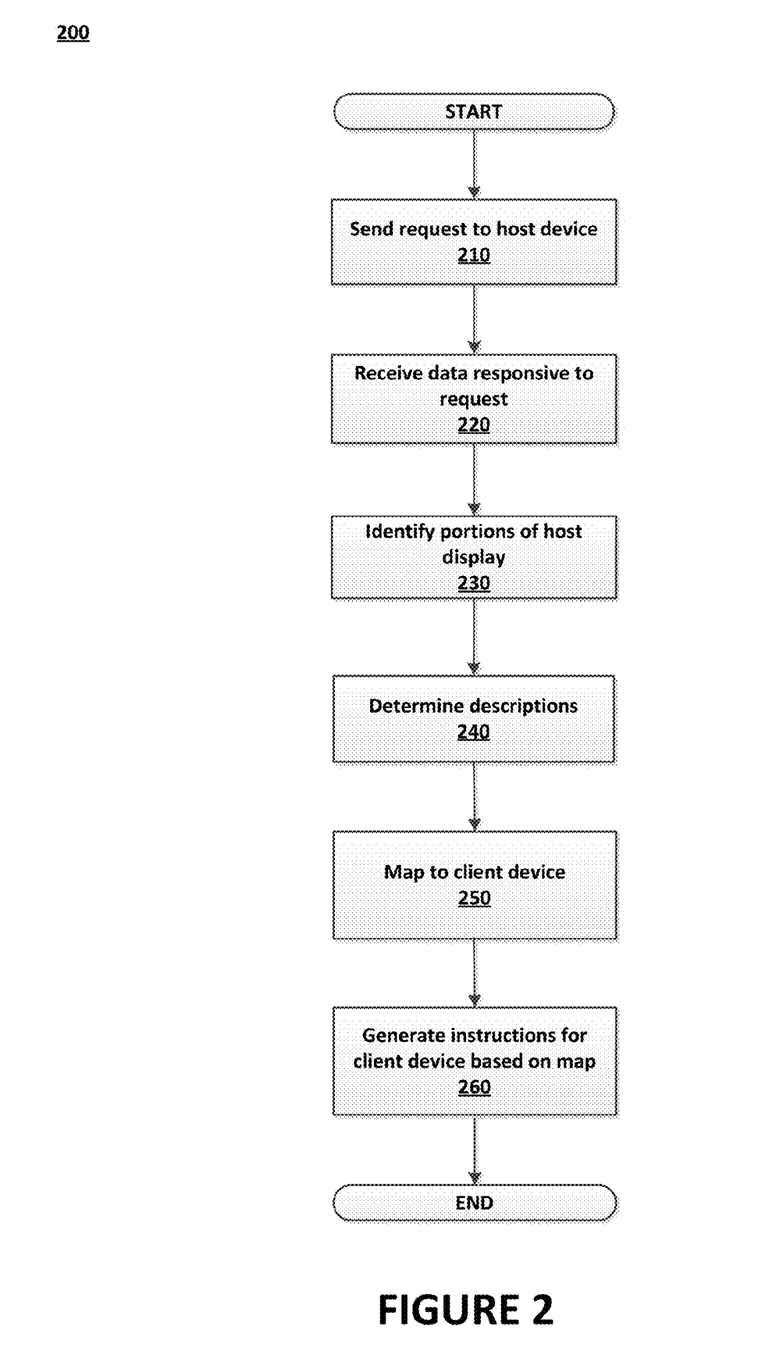
FIG. 2 is a flowchart illustrating an exemplary method of decomposition and recomposition for cross-platform display.

FIG. 2 illustrates a method 200 for decomposition and recomposition for cross-platform display. The method 200 of FIG. 2 may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The steps identified in FIG. 2 (and the order thereof) are exemplary and may include various alternatives, equivalents, or derivations thereof including but not limited to the order of execution of the same.

In method 200 of FIG. 2, a request is sent to host device, responsive data is received, the responsive data is evaluated to identify multiple portions of the display of the host device, determine an associated description for each portion, map the description to a corresponding component for the client device, and generate instructions for a display of a client device based on the mapped descriptions. The display instructions are executable by a client device to generate a display corresponding to the host device display, though reconfigured for the client device. In some embodiments, reconfiguration may include hiding, moving, or displaying various portions in a manner that is specific to the client device and that therefore appears different from the corresponding portion(s) of the host device.

In step 210, a request initiated at a requesting client device (e.g., user device 120A) is sent to a host device. The host device may be another user device 120 (e.g., user device 120C) and may host various types of data and resources, any of which may be subject of the request sent by the requesting client device 120A. For example, a mobile device 120A may request access to certain host data or may request that a task be performed by host device 120C (and/or host device applications).

In step 220, data responsive to the request is received. The responsive data includes information regarding a display of the host device 120C, which may have changed in response to the request sent in step 210. For example, where the mobile device 120A requests access to a document hosted on host device 120C, the display may include a window presenting at least a portion of the requested document. Similarly, where the mobile device 120A requests that host device 120C perform a task (e.g., launch an application), the display may include a window presenting a user interface associated with the application. In some embodiments, the data may include descriptions of the host device display, which may include XML-based (extensible markup language) descriptions.

In step 230, portions of the display of the host device 120C are identified. The display of the host device 120C may additionally include one or more interface portions. For example, a display of a Microsoft® Word document may include a portion displaying the actual content (e.g., the Word document), in addition to various toolbars, status bars, scroll bars, rulers, etc. that may be present.

Figure 3A:
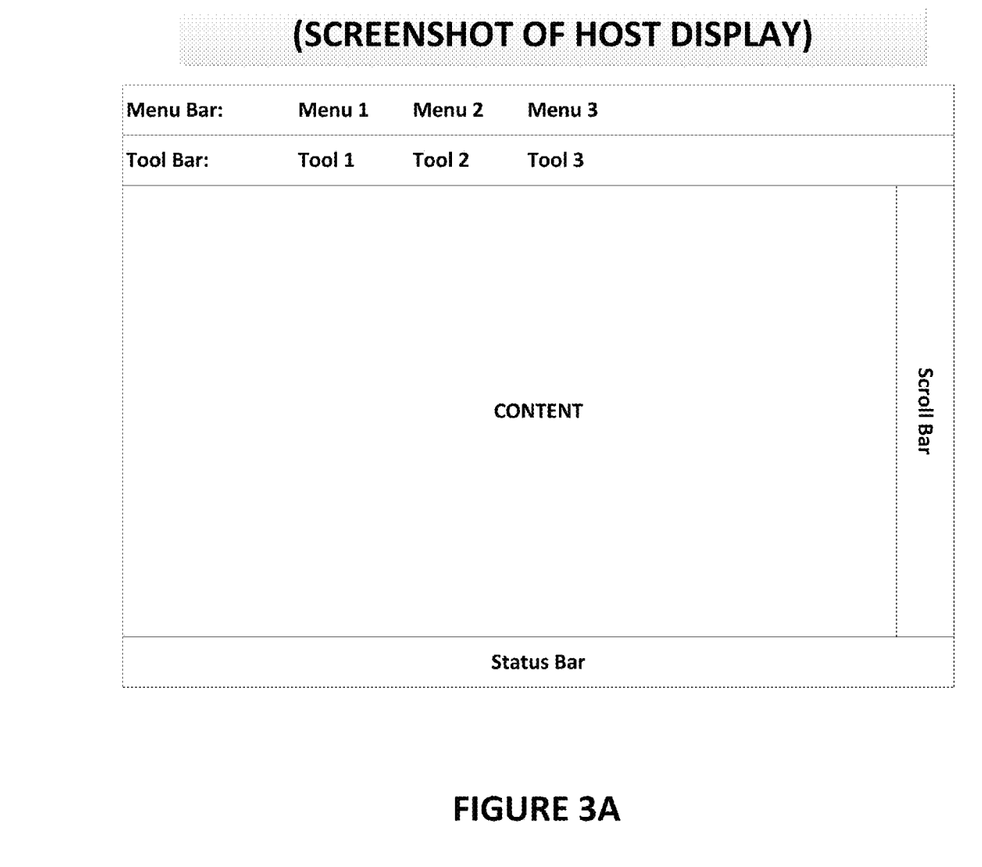
FIG. 3A is a screenshot of an exemplary display of a host device.

FIG. 3A illustrates a screenshot of an exemplary display of a host device. Depending on the application(s) currently running on host device 120C, there may be any number of content or interface portions that may be present in the display. The responsive data received in step 220 may include information indicating how many portions and what kind are currently associated with the display of host device 120C. As illustrated, FIG. 3A illustrates a content portion, as well as a menu bar, a tool bar, a status bar, and a scroll bar.

In step 240, a description is determined to be associated with each of the identified portions of the host device display. For example, the tool bar in FIG. 3A, as well as its associated tools may be associated with particular commands or instructions. The data received in step 220 (e.g., XML-based descriptions) may indicate or otherwise be used to determine which commands or instructions are associated with each portion (and/or sub-portion). This data may come primarily from a tool that can be used prior to publishing an application for remote access. This tool may utilize a combination of data sources including but not limited to application resources, window class, and tree view tagging. Application resources may include menus and dialogs within the application resources that would be used to identify relevant information. With respect to window class a running application may have certain window types that can be identified via the "Window Class". Tree view tagging tool may provide a tree view of the window hierarchy of an application in which certain portions of the application can be tagged as to how they should be presented on the various devices such as the main content area, toolbar area(s), etc.

Figure 3B:
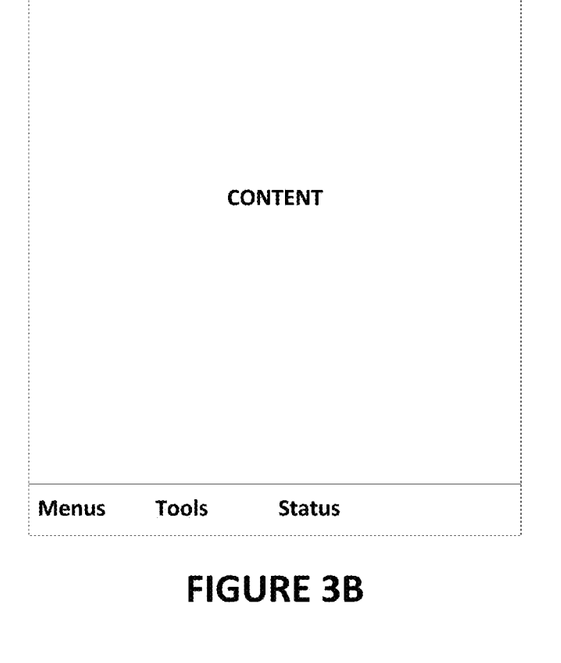
FIG. 3B is a screenshot of a display of a client device that is based on instructions generated in accordance with an exemplary method of decomposition and recomposition for cross-platform display.
Figure 3C:
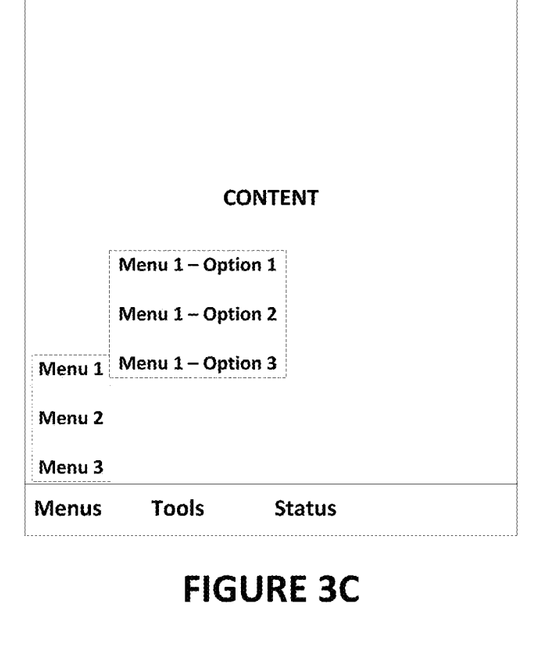
FIG. 3C is another screenshot of a display of a client device that is based on instructions generated in accordance with an exemplary method of decomposition and recomposition for cross-platform display.

In step 250, the descriptions are remapped to an associated component for use by client device 120A. The component may or may not be immediately displayed on the client device 120A. For example, a menu tab (e.g., Menu 1) displayed on a host device display may be hidden on the client device display until requested by the user. FIGS. 3B and 3C are client device displays generally corresponding to the host device display of FIG. 3A. As can be seen in FIG. 3B, the scroll bar of the host device display has been omitted. In addition, the menu bar, tool bar, and status bar of the host device display have been reconfigured into a single bar. The particular menus (e.g., Menu 1, Menu 2, and Menu 3) are not immediately visible in FIG. 3B. As can be seen in FIG. 3C, the particular menus (and sub-menus/menu options) may be reconfigured into pop-up windows that may appear, for example, when requested by a user. Such mapping for use by client device 120A may be based on automatic logic and/or developer-drive logic. Such logic may further be specific to the particular applications, hosts, clients, or host-client combinations.

In step 260, instructions regarding the display of the client device 120A are generated and provided to client device 120A for execution. The instructions provide for a corresponding display (e.g., of a content portion) of the host device 120C display with omitted or reconfigured portions (e.g., toolbars, status bars, scroll bars, rulers). Other adjustments of the client device 120A display are also possible, including re-centering, adjusting text size, and other display adjustments known in the art.

Various embodiments of the present invention allow for the method 200 to be performed by an intermediary device (e.g., server 130) which may be associated with the host device or reside elsewhere in the network (e.g., in the cloud). For example, server 130 may receive a request from a requesting client device 120A, forward to a host client device 120C, receive responsive data from host client device 120C, use the responsive data to identify the portions of the host device display, determine an associated description for each portion, map to a component for use by client device 120A, and generate the instructions for the client device 120A display based on the map, which may then be sent to client device 120A. Upon execution, the client device display may correspond to a display (e.g., a content portion) on the host device 120C, but the client device 120A may omit or reconfigure one or more portions (e.g., such that the portion is hidden until requested).

Alternatively, the method 200 may be performed by software downloaded to a user device 120. For example, software located at either requesting client device 120A or host device 120C may provide a request initiated at the requesting client device 120A to host client device 120C, receive data responsive to the request as provided by host client device 120C, use the responsive data to identify the portions of the host device display, determine an associated description for each portion, map to a component for use by client device 120A, and generate the instructions for client device 120A display based on the map, which may then be sent or otherwise provided to client device 120A for execution. The result may include a content portion corresponding to the host device 120C display, but other portion(s) may be omitted or reconfigured as compared to the host device 120C display.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A method for decomposition of cross-platform display, the method comprising:
   receiving data sent over communication network from a host device, the data including information regarding a display screen of the host device, the host device display screen comprising a view of content associated with a file opened using an application at the host device; and
   executing instructions stored in memory, wherein execution of instructions by a processor:
      identifies a plurality of different kinds of interface portions in the display screen of the host device, wherein each interface portion is associated with a command for the application hosted at the host device,
      determines a description for:
         each kind of interface portion, and
         each interface portion associated with each kind in the host device display screen,
      maps each of the descriptions to an interface component usable by a requesting client device that does not host a corresponding application, and
      generates instructions for the client device based on the mapped descriptions, and
   transmitting the generated instructions over the communication network to the client device, wherein execution of the transmitted instructions by the client device reconfigures the different kinds of interface portions in the host device display screen into a single interface portion for the client device based on the mapped descriptions, and wherein commands for the application hosted at the host device and associated with the identified plurality of interface portions are grouped by kind and accessible at the client device via the single interface portion.

2. The method of claim 1, wherein the different kinds of interface portions comprise one or more of toolbars, menu bars, status bars, scroll bars, or rulers.

3. The method of claim 1, wherein reconfiguration into the single interface portion comprises hiding one or more corresponding interface components until the single interface portion is selected.

4. The method of claim 3, wherein the one or more hidden interface components correspond to a plurality of menus associated with the application hosted at the host device, and wherein reconfiguration into the single interface portion comprises providing a single menu component associated with the plurality of menus.

5. The method of claim 1, wherein logic used for mapping the description is specific to the client device.

6. The method of claim 5, wherein logic used for mapping the description is further specific to the host device.

7. The method of claim 1, wherein execution of the transmitted instructions by the client device further includes:
   generating a client device display, the client device display including a view of content and the single interface portion, wherein at least one of the identified interface portions of the host device display screen are not included in the client device display of the single interface portion; and
   configuring the at least one identified interface portions into a corresponding at least one interface portion, wherein the at least one interface portion is displayed at the client device display in response to a request by a user at the client device, the user request regarding a command associated with the at least one identified portion.

8. The method of claim 7, wherein the at least one interface portion is a pop-up window.

9. An apparatus for decomposition of cross-platform display, the apparatus comprising:
   a communication interface that receives data over a communication network from a host device, the data including information regarding a display screen of a host device, the host device display screen comprising a view of content associated with a file opened using an application at the host device; and
   a processor that executes instructions stored in memory, wherein execution of instructions by the processor:
      identifies a plurality of different kinds of interface portions in the display screen of the host device, wherein each interface portion is associated with a command for the application hosted at the host device,
      determines a description for:
         each kind of interface portion, and
         each interface portion associated with each kind in the host device display screen;
      maps each of the descriptions to an interface component usable by the client device that does not host a corresponding application, and
      generates instructions for the client device based on the mapped descriptions;
   wherein the communication interface transmits generated instructions over the communication network to the client device, wherein execution of the transmitted instruction by the client device reconfigures the different kinds of interface portions in the host device display screen into a single interface portion for the client device based on the mapped descriptions, and wherein commands for the application hosted at the host device and associated with the identified plurality of interface portions are grouped by kind and accessible at the client device via the single interface portion.

10. The apparatus of claim 9, wherein the different kinds of interface portions comprise one or more of toolbars, menu bars, status bars, scroll bars, or rulers.

11. The apparatus of claim 9, wherein reconfiguration into the single interface portion comprises hiding one or more corresponding interface components until the single interface portion is selected.

12. The apparatus of claim 11, wherein the one or more hidden interface components correspond to a plurality of menus associated with the application hosted at the host device, and wherein reconfiguration into the single interface portion comprises providing a single menu component associated with the plurality of menus.

13. The apparatus of claim 9, wherein logic used for mapping the description is specific to the client device.

14. The apparatus of claim 13, wherein logic used for mapping the description is further specific to the host device.

15. A non-transitory computer-readable storage medium, having embodied thereon a program executable by a processor to perform a method for decomposition of cross-platform display, the method comprising:
- receiving data sent over a communication network from a host device, the data including information regarding a display screen of a host device, the host device display screen comprising a view of content associated with a file opened using an application at the host device;
- identifying a plurality of different kinds of interface portions in the display screen of the host device, wherein each interface portion is associated with a command for the application hosted at the host device;
- determining a description for:
  - each kind of interface portion, and
  - each interface portion associated with each kind in the host device display screen;
- mapping each of the descriptions to an interface component usable by a client device that does not host a corresponding application;
- generating instructions for the client device based on the mapped descriptions; and
- transmitting the generated instructions over the communication network to the client device, wherein execution of the transmitted instruction by the client device configures the different kinds of interface portions in the host device display screen into a single interface portion for the client device based on the mapped descriptions, and wherein commands for the application hosted at the host device and associated with the identified plurality of interface portions are grouped by kind and accessible at the client device via the single interface portion.

16. The non-transitory computer-readable storage medium of claim 15, wherein the different kinds of interface portions comprise one or more of toolbars, menu bars, status bars, scroll bars, or rulers.

17. The non-transitory computer-readable storage medium of claim 15, wherein reconfiguration into the single interface portion comprises hiding one or more corresponding interface components until the single interface portion is selected.

18. The non-transitory computer-readable storage medium of claim 17 wherein the one or more hidden interface components correspond to a plurality of menus associated with the application hosted at the host device, and wherein reconfiguration into the single interface portion comprises providing a single menu component associated with the plurality of menus.

19. The non-transitory computer-readable storage medium of claim 15, wherein logic used for mapping the description is specific to the client device.

20. The non-transitory computer-readable storage medium of claim 19, wherein logic used for mapping the description is further specific to the host device.

* * * * *